UNITED STATES PATENT OFFICE.

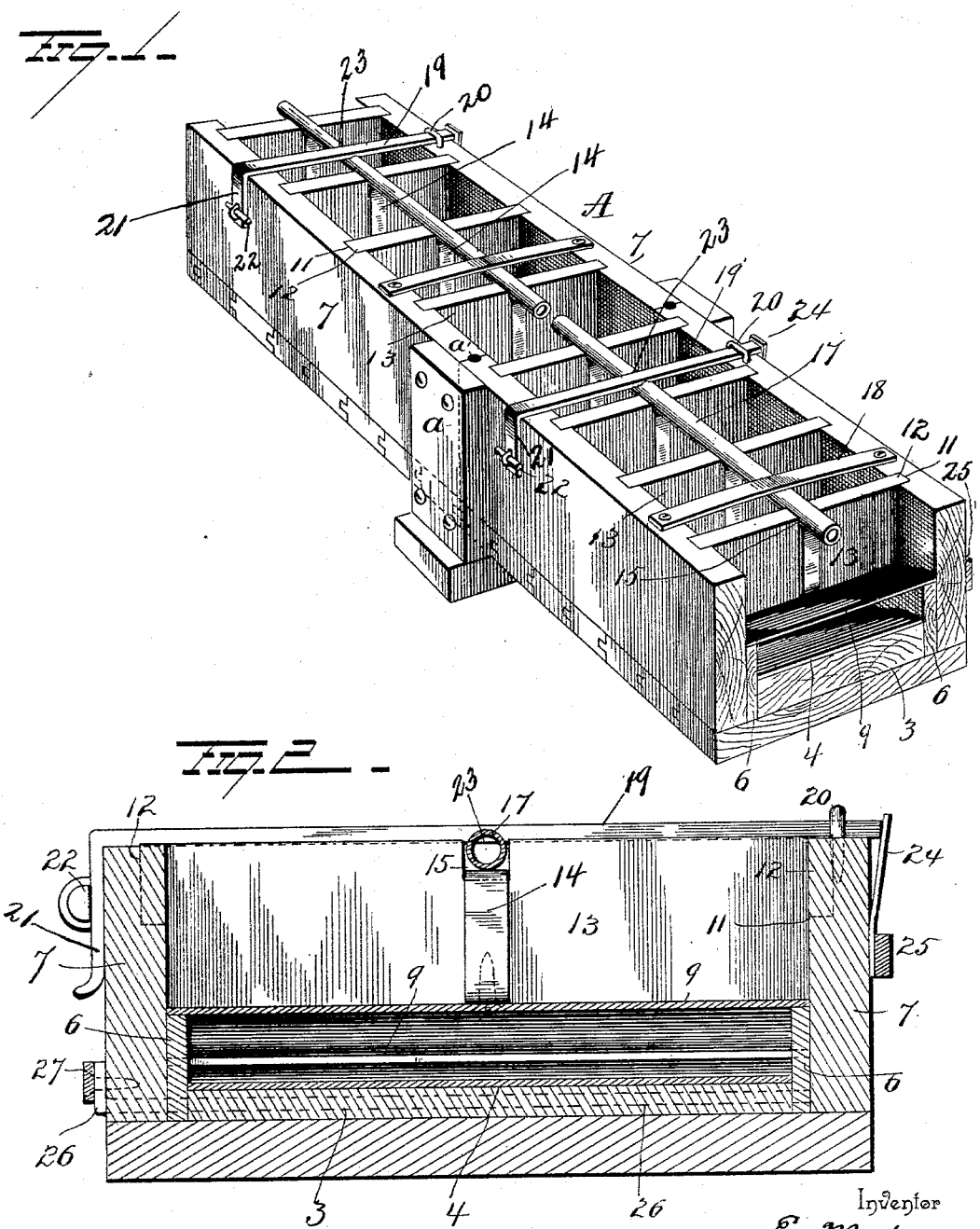

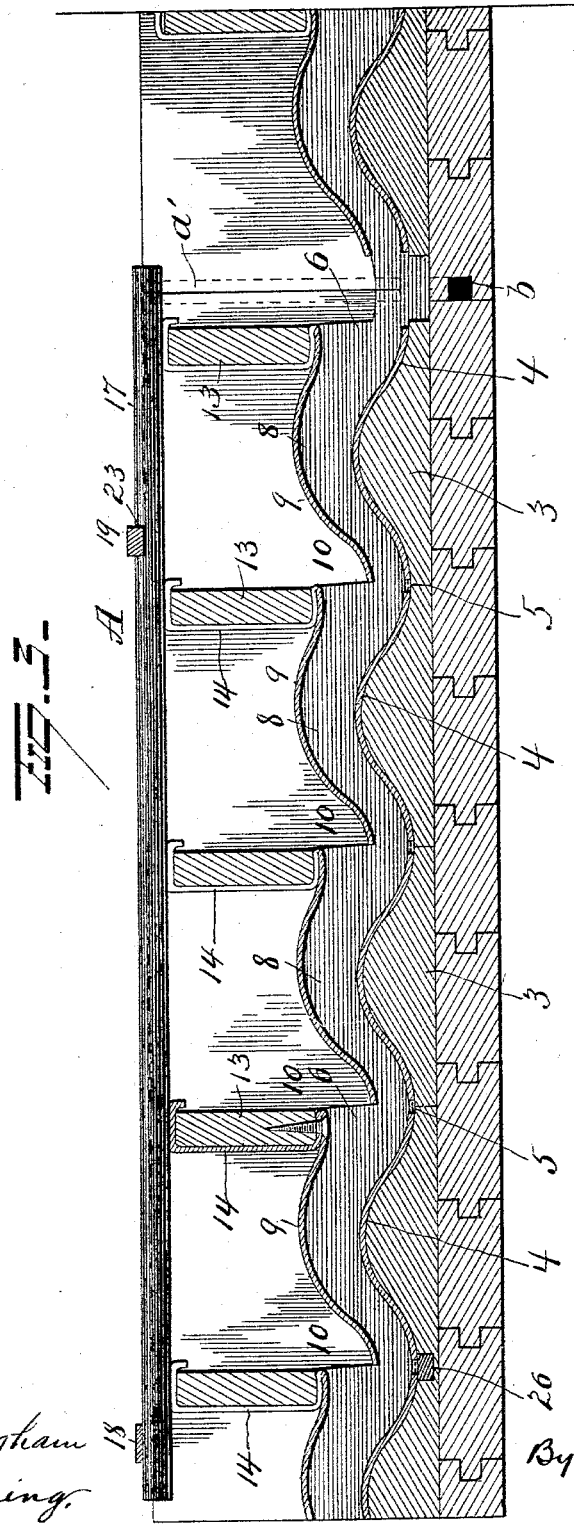

EMANUEL MOTZ, OF BREWER MINE, SOUTH CAROLINA, ASSIGNOR OF ONE-HALF TO HENRY F. WELCH, OF CHARLESTON, SOUTH CAROLINA.

ELECTROLYTIC APPARATUS.

SPECIFICATION forming part of Letters Patent No. 592,973, dated November 2, 1897.

Application filed June 26, 1897. Serial No. 642,434. (No model.)

*To all whom it may concern:*

Be it known that I, EMANUEL MOTZ, of Brewer Mine, in the county of Chesterfield and State of South Carolina, have invented certain new and useful Improvements in Electrolytic Apparatus; and I do hereby declare the following to be a full, clear, and exact description of the invention, such as will enable others skilled in the art to which it appertains to make and use the same.

My invention relates to an improved electrolytic apparatus for the separation of metals from their ores and solutions.

Heretofore in the construction and operation of electrolytic apparatus for recovering precious metals from their ores much difficulty and loss have been occasioned on account of serious inadequacy of the mechanical construction employed and the consequent inefficiency of the chemical agencies as used with such apparatus. Among the defects which have been hitherto encountered may be mentioned the liability of scouring action upon the cathode, with the result that portions of the metallic deposit thereon have been removed and carried off with the electrolyte and tailings as they leave the apparatus. Much difficulty has also arisen on account of inadequate, incomplete, and imperfect decomposition of the chemical electrolyte and the consequent ineffectual actions and reactions of the chemicals upon the electrodes of the apparatus and the material being treated for the recovery of valuable constituents. On account of the imperfect construction of prior apparatus strong chemical solutions have been resorted to, but even with such large and expensive use of chemicals the results heretofore accomplished have been unsatisfactory on account of the incomplete separation and recovery of the precious metal contained in the ore being treated.

One object of my invention is to construct an electrolytic apparatus in such manner as to insure the perfect and complete actions and reactions of the chemical electrolyte upon and with the electrodes of the apparatus and the metal under treatment.

A further object is to so construct an electrolytic apparatus that the chemical actions and reactions shall be such that the chemical employed shall be decomposed and its active element be set free at the most advantageous part of the apparatus to effect the separation and deposit of the precious metal and afterward be reunited with its base to form the original chemical, which will be again disseminated for the purpose stated and subsequently reunited with the base, and so on throughout the operation of the apparatus.

A further object is to so construct the apparatus as to overcome the disastrous effects of scouring of the cathode by the electrolyte and pulp.

A further object is to produce an electrolytic apparatus which shall be economical in operation and maintenance and cheap to construct.

A further object is to so construct the apparatus that an adequate agitation of the electrolyte, &c., will be insured by gravity and without the use of an independent agitator.

A further object is to so construct the apparatus that its operation in the separation and recovery of metal shall be simultaneous and continuous.

A further object is to construct the apparatus in such manner as to render the stopping of its operation for cleaning purposes unnecessary.

A further object is to produce an electrolytic apparatus for the separation and recovery of metals which shall be simple in construction, which can be operated by persons having no technical knowledge of electrolysis, which shall be safe from unwarranted interference, which shall operate mechanically, chemically, and electrically in the continuous and simultaneous separation and deposition of metals, and which shall be effectual in all respects in the performance of its functions.

With these objects in view the invention consists in the method of treating ore for the separation and recovery of metals, consisting in reducing or crushing the ore, mixing it with an electrolyte, passing the ore and electrolyte through channels having contracted outlet ends and having opposing walls composed of anodes and cathodes, and passing an electric current through said anodes and cathodes and from one to the other.

My invention further consists in an electrolytic apparatus consisting of a frame and a series of undulatory communicating passages or channels, each having a contracted outlet and each having opposing walls composed of an anode and a cathode, respectively.

My invention further consists in certain other novel features of construction and combinations and arrangements of parts, as hereinafter set forth, and pointed out in the claims.

In the accompanying drawings, Figure 1 is a perspective view illustrating my improved apparatus. Fig. 2 is a horizontal section. Fig. 3 is a longitudinal section.

A represents a frame or sluice composed of any desired number of removable sections connected together by means of battons $a$, and each section is of such size as can be readily and conveniently handled by one man. The bottom of the frame or sluice is preferably composed of wooden slats dovetailed together. The abutting ends of the sides of each section of the frame or sluice are made with vertical grooves which aline to form sockets $a'$, which communicate with a transverse channel or groove $b$ in the bottom of the sluice. In these sockets and grooves asphalt or other packing material will be poured, whereby to make a tight joint between the sections.

The upper face of the bottom of the frame or sluice is made undulatory or corrugated, and this may be readily accomplished by means of wooden blocks 3, having their upper faces curved or convex. On the curved face of each block 3 an amalgamated copper plate 4 is disposed, each copper plate being convex in conformity with the face of the block and constituting a negative electrode or a cathode of the apparatus. Thus it will be seen that a series of the curved cathodes will form a corrugated or undulatory bottom to the frame or sluice. The adjacent ends of the respective cathode-plates do not abut, but are separated slightly to form transverse grooves 5, in which mercury is placed, whereby to form proper electrical connection between said cathode-plates, and also to constitute packing between them.

The spaces between the end cathode-plates of abutting sections of the apparatus are made to form mercury-wells, in which excess of mercury in the apparatus may collect without electrically connecting the plates of one set with those of another.

A strip 6, preferably of wood or other non-conducting material, is disposed alongside the inner face of each side 7 of the frame or sluice, and each strip 6 is made at its upper edge with a series of convex shoulders 8, located above the curved blocks 3 and the cathodes thereon. Each curved shoulder 8 is diagonal or inclined in general direction, so as to be eccentric with the curve of the block 3 beneath it. The positive electrodes or the anodes 9, preferably of lead, are placed on the curved shoulders or supports 8 of the respective strips 6, so as to be disposed over and eccentric to the cathode-plates in the bottom of the frame or sluice. From this construction it will be seen that the anode and cathode plates constitute broken or interrupted communicating passages or channels, each being contracted in size at its outlet end and forming a nozzle. The frame or sluice will be disposed in an inclined position, so that when the electrolyte and ore are inserted they will flow by gravity through the passage or channel, and on account of the peculiar formation of said passage the electrolyte and ore or pulp will be effectually agitated by gravity without the aid of auxiliary agitating means and without the scouring effect heretofore encountered upon the cathode-plate. By contracting the outlets of the respective communicating passages the force of the flow from one passage to the next will be increased and the agitation of the electrolyte and pulp will be proportionately augmented.

As the pulp passes from one passage to another the electrolyte with which it is mixed will back up into the spaces 10 between the respective anode-plates and serve as seals to prevent the escape of the active element or gas set free during the operation of the apparatus.

The sides 7 of the frame or sluice are provided in their inner faces, at their upper edges, with recesses 11, in which tenons 12 at the upper ends of a series of blocks 13 enter and in which said blocks are supported. The blocks 13 are of proper length to extend to or nearly to the more elevated ends of the respective lead anode-plates. A conductor 14 is secured to each anode and block, extended upwardly alongside the block and has its free end disposed in a recess 15 made in the upper edge of said block. A longitudinally-disposed pipe, rod, or other suitable conductor 17 is disposed in the recesses 15 of the respective blocks of each section of the sluice or apparatus, so as to make electrical contact with the conductors 14. The pipes or conductors 17 are held in position at one end of the respective sections of the sluice by means of a fixed cross-bar 18, secured at its respective ends to sides 7 of the sluice. At the other end of each section of the sluice a transverse bar 19 is removably disposed, being held at one end by a staple 20 or other suitable device and provided at its other end with an arm 21, adapted to be attached to the side of the sluice by means of a pin 22 or other suitable fastening device.

The pipe or conductor 17 is made with a notch or recess 23, through which the transverse bar 19 passes, so that when said transverse bar is locked, as above explained, the parts of the apparatus cannot be handled or removed by unauthorized persons. A spring-arm 24 is secured to each section of the sluice against which the respective transverse bars 19 make electrical contact, and said spring-arms are electrically connected with a common conductor 25, the latter being connected with the positive terminal of an electric generator.

Transverse bars 26 are disposed in recesses in the abutting ends of two blocks 3 of each series and are electrically connected by means of a common conductor 27 with the negative terminal of the electric generator. Thus it will be seen that the anodes and cathodes are arranged in parallel between the line conductors and through the electrolyte and pulp passing between them.

In operating the apparatus to carry my improved process into effect the ore containing the metal will first be reduced by crushing or otherwise into finely-divided particles and then mixed with a solvent in solution and fed in the upper end of the sluice (the electrical circuit having been closed) and allowed to pass by gravity through the channel therein formed by the serial arrangement of nozzles. In the passage of the pulp through the apparatus larger particles of gold will be caught mechanically by the copper cathode-plates and be promptly amalgamated thereon. The finer particles which will in effect be held in suspension by the solution and are forced upward against the anode of the succeeding nozzle and thus brought and held in the zone of intensest action of the solvent agents are thereby quickly dissolved and carried down to the cathode by the electric current. After the pulp leaves the apparatus the cyanid solution will be separated from the exhausted ore in any suitable manner and used over again in the apparatus in the manner above explained.

By the construction and arrangement of the apparatus the electrodes can be readily removed for removing the metallic deposits on the cathode-plates without stopping the operations of the entire apparatus.

Various slight changes might be made in the details of construction of my invention without departing from the spirit thereof or limiting its scope, and hence I do not wish to limit myself to the precise details herein set forth.

Having fully described my invention, what I claim as new, and desire to secure by Letters Patent, is—

1. In an electrolytic apparatus, the combination with a trough or sluice, of a series of curved communicating passages, each passage being tapering from its inlet to its outlet end and the opposing walls of each passage being formed by cathode and anode plates respectively, substantially as set forth.

2. In an electrolytic apparatus, the combination with a trough or sluice, of an undulatory passage extending from one end to the other of said trough or sluice and having its opposing walls made of cathode and anode plates respectively, said undulatory passage being subdivided into a series of smaller communicating passages, each being tapering longitudinally from the inlet to the outlet end thereof, substantially as set forth.

3. In an electrolytic apparatus, the combination with a frame and a series of convex cathode-plates in the bottom thereof, of inclined anode-plates disposed above the cathode-plates and having concave under faces so as to form a series of communicating passages tapering from their inlet to their outlet ends, substantially as set forth.

4. In an electrolytic apparatus, the combination with a frame or sluice and convex blocks disposed in the bottom of said frame or sluice, of a series of convex cathode-plates disposed on said blocks, strips disposed within said frame or sluice and having curved upper edges and anode-plates supported on said curved upper edges and conforming thereto so as to have convex under faces, said anode and cathode plates being so disposed relatively to each other as to form a series of curved communicating tapering passages, and means for including said anode and cathode plates in circuit with an electric generator, substantially as set forth.

5. In an electrolytic apparatus, the combination with a sluice composed of insulated sections, of a series of curved communicating passages in each section, each passage having opposing walls composed of anode and cathode plates, the adjacent passages of the respective sections being in communication with each other, substantially as set forth.

6. In an electrolytic apparatus, the combination with a frame or sluice, and a series of convex blocks located therein, of a series of convex cathode-plates located on said blocks and spaced apart, mercury-connectors between the adjacent edges of said plates, a bar electrically connected with one of said mercury-connectors, a conductor attached to said bar, anode-plates disposed over the cathode-plates and means for including the anode-plates in an electric circuit, substantially as set forth.

7. In an electrolytic apparatus, the combination with a frame or sluice, of a series of convex cathode-plates located in the bottom of said frame or sluice, a series of anode-plates having curved under faces and disposed above said cathode-plates, blocks secured to the anode-plates and supported in the frame or sluice, each block having a recess in its upper edge, a series of conductors connected with said anode-plates and terminating in said recesses in the blocks, a conducting-rod disposed in said recesses on the first-mentioned conductors and having a notch therein, a cross-bar passing through said notch, a conductor with which said cross-bar is electrically connected, locking devices for securing the cross-bar to the frame or sluice, and a conductor connected with the cathode-plates, substantially as set forth.

8. In an electrolytic apparatus, a frame or sluice composed of a series of sections, the abutting ends of the sides and bottoms of the sections having grooves, packing material in said grooves, and a series of cathode-plates and a series of coöperating anode-plates in each section, said anode and cathode plates being so disposed relatively to each other as to form a series of tapering communicating passages, substantially as set forth.

9. In an electrolytic apparatus, the combination with a frame or sluice, of several sets of anode-plates and several sets of cathode-plates in said frame or sluice, means for including each set of anode and cathode plates in an electric circuit and mercury-wells between the respective sets of cathode-plates and out of electrical connection therewith, substantially as set forth.

In testimony whereof I have signed this specification in the presence of two subscribing witnesses.

EMANUEL MOTZ.

Witnesses:
R. S. FERGUSON,
C. S. DRURY.